United States Patent
Thukral

(10) Patent No.: US 7,548,995 B2
(45) Date of Patent: Jun. 16, 2009

(54) STRATEGIES FOR DISSEMINATING MEDIA INFORMATION USING REDUNDANT NETWORK STREAMS

(75) Inventor: Vivek Thukral, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 570 days.

(21) Appl. No.: 11/256,222

(22) Filed: Oct. 21, 2005

(65) Prior Publication Data

US 2007/0091789 A1    Apr. 26, 2007

(51) Int. Cl.
*G06F 3/00* (2006.01)
(52) U.S. Cl. .......................... 710/20; 370/216; 370/390
(58) Field of Classification Search ................. 370/390, 370/216–228; 710/20; 709/203, 206–207
See application file for complete search history.

(56) References Cited

U.S. PATENT DOCUMENTS

2006/0085551 A1* 4/2006 Xie et al. .................... 709/231
2006/0127059 A1* 6/2006 Fanning ...................... 386/125

OTHER PUBLICATIONS

"Transmission Control Protocol," from Wikipedia, the free encyclopedia, available at <<http://en.wikipedia.org/wiki/Transmission_Control_Protocol>>, accessed on Nov. 9, 2005, 7 pages.
Apple QuickTime homepage, provided by Apple of Apple, Cupertino, CA, available at <<http://www.apple.com/quicktime/mac.html>>, accessed on Nov. 9, 2005, 1 page.
"An Introduction to QuickTime," available at <<http://developer.apple.com/quicktime/qttutorial/streaming.html>>, accessed on Nov. 9, 2005, 4 pages.
"QuickTime Streaming" introductory page, available at <<http://developer.apple.com/documentation/quicktime/REF/Streaming.htm>>, accessed on Nov. 9, 2005, 2 pages.
U.S. Appl. No. 11/012,891, filed Dec. 15, 2004, Green et al., entitled "Retry Strategies for Use in a Streaming Environment."

* cited by examiner

*Primary Examiner*—Ricky Ngo
*Assistant Examiner*—Kibrom T Hailu
(74) *Attorney, Agent, or Firm*—Lee & Hayes, PLLC

(57) ABSTRACT

A system is described for disseminating media information. An operations center transmits at least a primary stream on a first network connection and a backup stream on a second network connection to a media device (such as a set-top box). The media device identifies whether the primary stream includes any missing information, and, if so, supplies the missing information from the backup stream. The primary stream and the backup stream can have the same or different bit rates. The operations center can send the backup stream as a component of a multiplexed stream, including at least one other stream. Through these provisions, the system provides a streaming mechanism that is both reliable and scalable.

19 Claims, 9 Drawing Sheets

STRATEGIES FOR DISSEMINATING MEDIA INFORMATION USING REDUNDANT NETWORK STREAMS

BACKGROUND

A number of technologies have been developed to stream media information from a source device to a target device. In the context of a digital network, the source device can comprise server functionality, and the target device can comprise a personal computer, set-top box, game console, and so forth. In a broadcast scenario, the source device can supply media information to a plurality of target devices. A target device can "tune" to receive the media information by specifying an appropriate multicast address.

In such environments, information is commonly "lost" during transmission. This results in, for example, the reception of a stream having missing packets. The loss of information can manifest itself in various artifacts in the presentation of such information. Or the loss of information can entirely disable the transmission of information. Accordingly, various mechanisms have been devised for dealing with the loss of information in transmission.

In one such technique, a target device which detects missing information can send is a message to the source device (for example, the target device can send a negative acknowledgement, i.e., NAK, message). Upon receipt of this message, the source device can supply the missing information to the target device. However, this solution may suffer from reliability problems. Namely, streaming media technology imposes real time delivery demands. It may happen that the source device cannot deliver the missing information by the time that the target device needs it. If the source device cannot remedy the "holes" in the stream of media information by the time that the target device needs to decode this information, then the presentation may suffer from visually discernable discontinuities or other problems. According to another potential problem, the source device may use a hierarchy of nodes to broadcast the media information to a plurality of target devices. In this scenario, the source device may also send missing information to target devices which do not require this information, potentially burdening these devices (which must examine and discard this information).

In another technique, a system can provide a special unicast back channel for each target device. The source device can send only those packets that are lost via the back channel. This solution may fare better in terms of reliability than the first solution. However, this solution may have scaling problems. Namely, since the system must allocate a separate channel to each device, adding more devices proportionally increases the complexity of the system, as well as the processing burden placed on the source device.

There is accordingly a need in the art to provide a mechanism for supplying missing information that is both reliable and scalable.

SUMMARY

A system is described for disseminating media information. In the system, an operations center transmits at least a primary stream of information ("primary stream") on a first network connection and a backup stream of information ("backup stream") on a second network connection to a media device (such as a set-top box). The media device identifies whether the primary stream includes any missing information, and, if so, supplies the missing information from the backup stream.

According to one exemplary feature, the operations center multicasts the primary stream and the backup stream via two respective multicast addresses.

According to another exemplary feature, the primary stream and the backup stream can have the same bit rate. Alternatively, the primary stream can have a higher bit rate than the backup stream. For instance, the backup stream can represent a full scale, but lower resolution, version of the primary stream. Or the backup stream can represent a reduced scale version of the primary stream, e.g., a picture-in-picture (PIP) version of the primary stream. Or the backup stream can contain a subset of the frames provided by the primary stream (such as only key frames), and so forth.

According to another exemplary feature, the media device fills in the missing information on the level of granularity of packets in the streams. This is a particularly apt strategy in those scenarios in which the primary stream and the backup stream are exact duplicates. In another implementation, the media device fills in the missing information on the level of granularity of Group of Pictures (GOPs). This is a particularly apt strategy in those scenarios in which the primary stream and the backup stream are not exact duplicates.

According to another exemplary feature, the operations center can transmit the backup stream by multiplexing this stream with at least one other stream. For example, in the case in which the backup stream represents a PIP stream, the operations center can multiplex together plural PIP streams that can be accessed by a collection of media devices provided in a household. The multiplex stream is made available through a multiplex address, in conjunction with a port associated with the household.

The functionality summarized above confers a number of benefits. According to one exemplary benefit, the functionality provides a mechanism for delivering media information in a manner which is both highly reliable and scalable.

The reliability of the functionality ensues from the fact that losses in the primary stream will rarely be correlated with losses in the backup stream. Further, since the primary stream and the backup stream are sent concurrently, the media device can immediately rely on the backup channel to provide the missing information (without having to specifically request this information from the operations center, e.g., using an ACK or NAK message).

The scalability of the functionality ensues from the fact that redundancy is fundamentally provided on the network level (by providing redundant multicast network connections), rather than on the operations center level. As such, increasing the number of media devices that utilize the above-described redundancy mechanism does not place proportionally increasing demands on the operations center (e.g., by requiring the implementation of special per-device back channels).

Additional exemplary implementations and attendant benefits of the functionality are described in the following.

The subject matter set forth in this Summary section refers to exemplary manifestations of the invention, and hence does not limit the scope of the invention set in the Claims section. More specifically, the Claims section may set forth aspects of the invention which are broader in scope than the concepts described in this Summary section.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth strategies for disseminating media information from a source entity to one or more target entities using redundant streams of information. To facilitate explanation, the phrase "streams of information" will be shortened to "streams."

In the context most often evoked in this discussion, the information being delivered corresponds to media information. Media information can include any information that conveys audio and/or video information, such as audio resources (e.g., music, spoken word subject matter, etc.), moving picture resources (e.g., audio-visual television programs, movies, etc.), computer programs (e.g., games, etc.), and so on. However, in a broader context, the information can correspond to any kind or combination of data that can be consumed by a user in any fashion and in any environment.

This disclosure includes the following sections. Section A explains an overview of an exemplary system for delivering media information using redundant streams and associated network connections. Section B describes one exemplary concrete application of the system of Section A.

A. Overview

A.1. Exemplary System

Generally, any of the functions described with reference to the figures can be implemented using software, hardware (e.g., fixed logic circuitry), manual processing, or a combination of these implementations. The terms "logic, "entity," "module," or "functionality" as used herein generally represents software, hardware, or a combination of software and hardware. For instance, in the case of a software implementation, the terms "logic," "entity," "module" or "functionality" represent program code (and/or declarative-type instructions) that performs specified tasks when executed on a processing device or devices (e.g., CPU or CPUs). The program code can be stored in one or more computer readable memory devices.

More generally, the illustrated separation of logic, entities, modules and functionality into distinct units may reflect an actual physical grouping and allocation of such software and/ or hardware, or can correspond to a conceptual allocation of different tasks performed by a single software program and/or hardware unit. The illustrated logic, entities, modules and functionality can be located at a single site (e.g., as implemented by a processing device), or can be distributed over plural locations.

Figure 1:
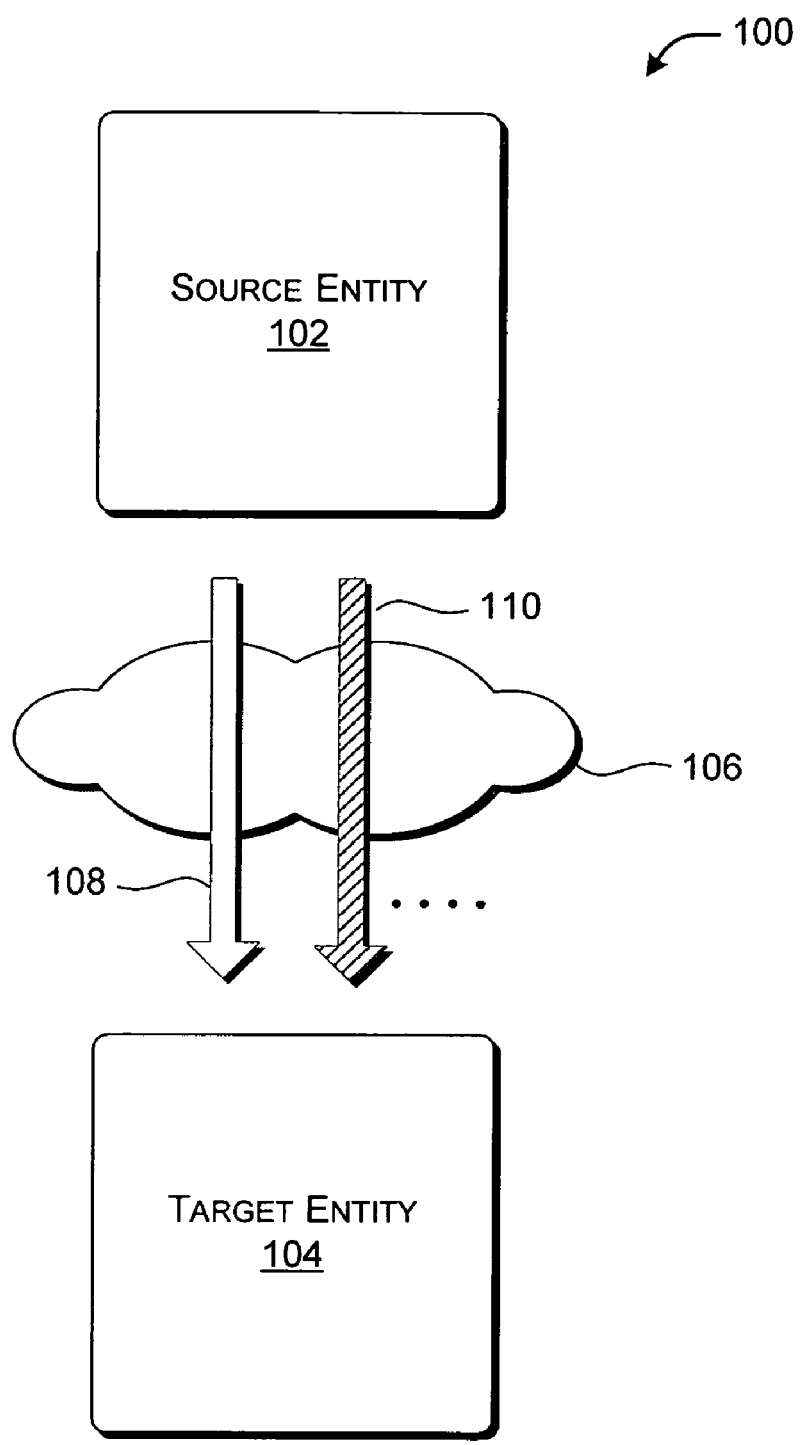
FIG. 1 shows an overview of an exemplary system for delivering media information from a source entity to a target entity, involving the use of redundant streams delivered by plural network paths.

FIG. 1 shows an overview of a system 100 for sending media information from a source entity 102 to a target entity 104 via a coupling mechanism 106. The system 100 uses two or more redundant multicast streams (e.g., streams 108, 110) to transmit the media information.

The streams (108, 110) are "redundant" in the sense that they carry the same media information at the same time. One of these streams (106, 108) comprises a primary stream, while one or more of the other streams comprise backup streams. In the context of FIG. 1, stream 108 comprises the primary stream and stream 110 comprises the backup stream. (Although FIG. 1 shows a single backup stream, more than one backup stream can be provided.) In operation, the target entity 104 consumes the primary stream 108 as the primary source of the media information. If the target entity 104 encounters missing information in the primary stream, it can draw the missing information from the backup stream 110 (if possible).

The solution provided by the system 100 confers a number of benefits. As to reliability, loss of information in the primary stream 108 will generally not be correlated with loss of information in the backup stream 110. This is because the system 100 allocates two network connections to the two respective streams (108, 110). Thus, the system 100 should, most of the time, be able to rectify loss information in the primary stream 108 with information in the backup stream 110. Moreover, the missing information is immediately available, without having to request it from the source entity 102 and wait for it to arrive. As to scalability, the error recovery solution shown in FIG. 1 is achieved by providing redundancy on the network level, rather than imposing special constraints on the source entity 102. This means that the system 100 can be expanded to include more target entities without imposing proportional burdens on the source entity 102.

The following discussion expands on the above-described features of the system 100 shown in FIG. 1.

To begin with, the architecture of the system 100 can be implemented in many different ways to suit many different environments. In one case, the source entity 102 can comprise one or more computer server entities which deliver media information to one or more target entities via a client-server paradigm of interaction. In an another implementation, the server entity 102 can comprise a computer which delivers the media information to one or more target entities using a peer-to-peer (P2P) paradigm of interaction. Still other implementations of the source entity 102 are possible.

The target entity 104 can likewise be implemented in different ways. The target entity 104 can comprise any entity which can receive and process the media information. Exemplary kinds of target entities include any kind of computer, set-top box, game console, and so forth. In one scenario, the target entity 104 can process the media information for output to a presentation device (such as display device and/or speaker device, etc.).

The target entity 104 can, in turn, disseminate the media information to another target entity (not shown). In this role, the target entity 104 assumes the role of a source entity. Although not shown, in this role, the target entity 104 can also use multiple redundant streams to ensure that loss of information can be corrected by the downstream target entity.

At to the coupling mechanism 106, this mechanism can comprise any kind or combination of conduits of information. For instance, the coupling mechanism 106 can include any kind of network (or combination of networks), such as a wide area network (e.g., the Internet), an intranet, Digital Subscriber Line (DSL) network infrastructure, point-to-point coupling infrastructure, and so on. The coupling mechanism 106 can use or involve any kind of protocol or combination of protocols. In the case where one or more digital networks are used to disseminate information, the coupling mechanism 106 can include various hardwired and/or wireless links, routers, gateways, name servers, and so on. In the case where DSL infrastructure is used to disseminate information, the coupling mechanism 106 can utilize the services, in part, of telephone coupling infrastructure and DSL processing functionality.

Whatever coupling architecture is used, the system 100 can deliver media information to the target entity 104 using a variety of packaging paradigms. The media information can be expressed in any format, including, but not limited to, the MPEG2 standard, Microsoft Corporation's VC-1 standard, the ISO/ITU H.264 standard, and so forth. The coded media information can be encapsulated into packets using any format, including, but not limited to, the Real Time Transport Protocol (RTP), the Real Time Streaming Protocol (RTSP), the Advanced Streaming Format (ASF), and so forth.

The system 100 allocates different network connections for each of the streams (108, 110), such that these streams can be transmitted in a largely independent manner. More specifically, the two streams (108, 110) are provided on separate network connections in the sense that the source entity 102 can devote separate functionality (such as separate network cards associated with two different respective addresses) for transmitting the media information over the coupling mechanism 106. In the sense that both streams (106, 108) can use the same coupling mechanism 106, the allocation of two network connections and associated network paths should be interpreted as referring to the use two distinct logical paths.

Different delivery strategies can be used to transmit the streams (108, 110). As mentioned above, the streams (108, 110) can represent multicast streams. The term "multicast" refers to the delivery of resource information to potentially multiple target devices in a manner that does not require per-client allocation of communication resources (and particularly, does not require per-client allocation of server resources). The term "multicast" may encompass certain types of Internet Protocol (IP) multicasting technologies, such as the Internet Group Management Protocol (IGMP), but is not limited to such specific multicasting technologies. As very broadly used herein, the term "multicast" is generally synonymous with the term "broadcast." In the context of FIG. 1, the system 100 can allocate different multicast addresses to the two different streams (108, 110). The multicast streams can be transmitted using any protocol, such as the User Datagram Protocol (UDP) protocol.

Figure 2:
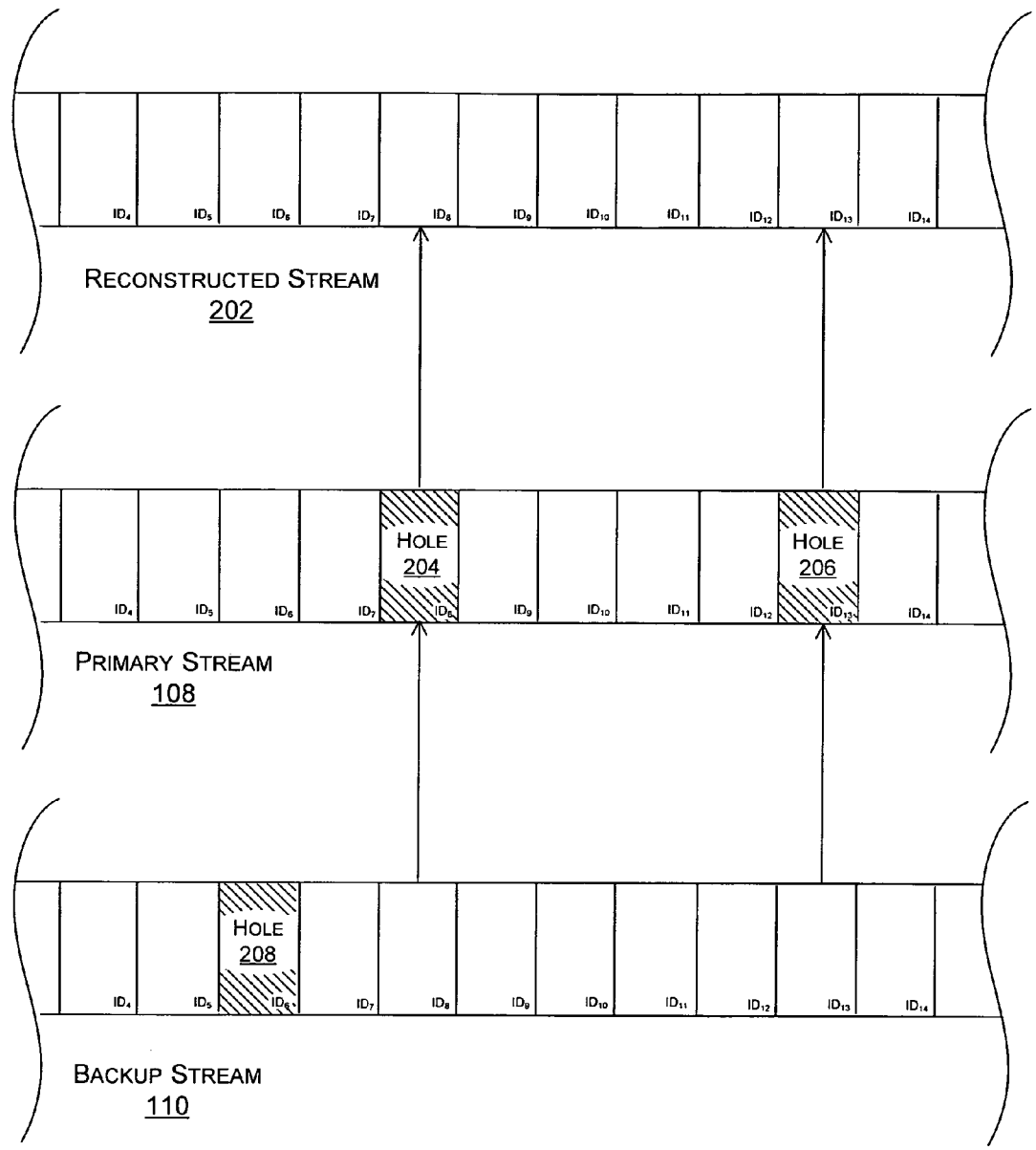
FIG. 2 shows a series of streams which illustrates the manner of operation of the system shown in FIG. 1.

FIG. 2 shows an example of the manner in which the target entity 104 can form a reconstructed steam 202 from the primary stream 108 and the backup stream 110. That is, assume that the target entity 104 uses the primary stream 108 to supply media information for whatever processing is performed by the target entity 104. The target entity 104 can use the backup stream 110 to supply media information in the event that the primary stream 108 contains missing information. The target entity 104 produces the reconstructed stream 202 by inserting media information from the backup stream 110 into the primary stream 108.

For example, assume in this illustrative case that the primary stream 108 includes two missing packets, comprising a "hole" 204 and a "hole" 206. (The primary stream 108 can include any combination of missing packets, including multiple consecutive missing packets.) Assume further that each packet includes header information with information that identifies the packet, such as an ID number. In this case, the primary stream 108 omits a packet having an ID of 6 and a packet having an ID of 13. The target entity 104 fills in this missing information by pulling identical packets from the backup stream 110, namely a packet having an ID of 6 and a packet having an ID of 13. This is generally possible because omissions in the primary stream 108 will generally not be correlated with omissions in the backup stream 110 (because these streams use different network connections). Thus, for instance, although the backup stream 110 may also omit information (such as in hole 208), this missing information will generally not match the missing information in the primary stream 108.

The scenario shown in FIG. 2 corresponds to the illustrative case in which the primary stream 108 and the backup stream are identical streams carrying the same information. However, as will be discussed in Section B below, in other implementations, the streams (108, 110) can differ in one or more respects. For example, the primary stream 108 can have a higher bit rate than the backup stream 110. In these circumstances, the target entity 104 can substitute media information into the primary stream 108 from the backup stream 110 on a different level of granularity than packets. For example, the target entity 104 can make substitution on the level of granularity of Group of Pictures (GOPs).

Figure 3:
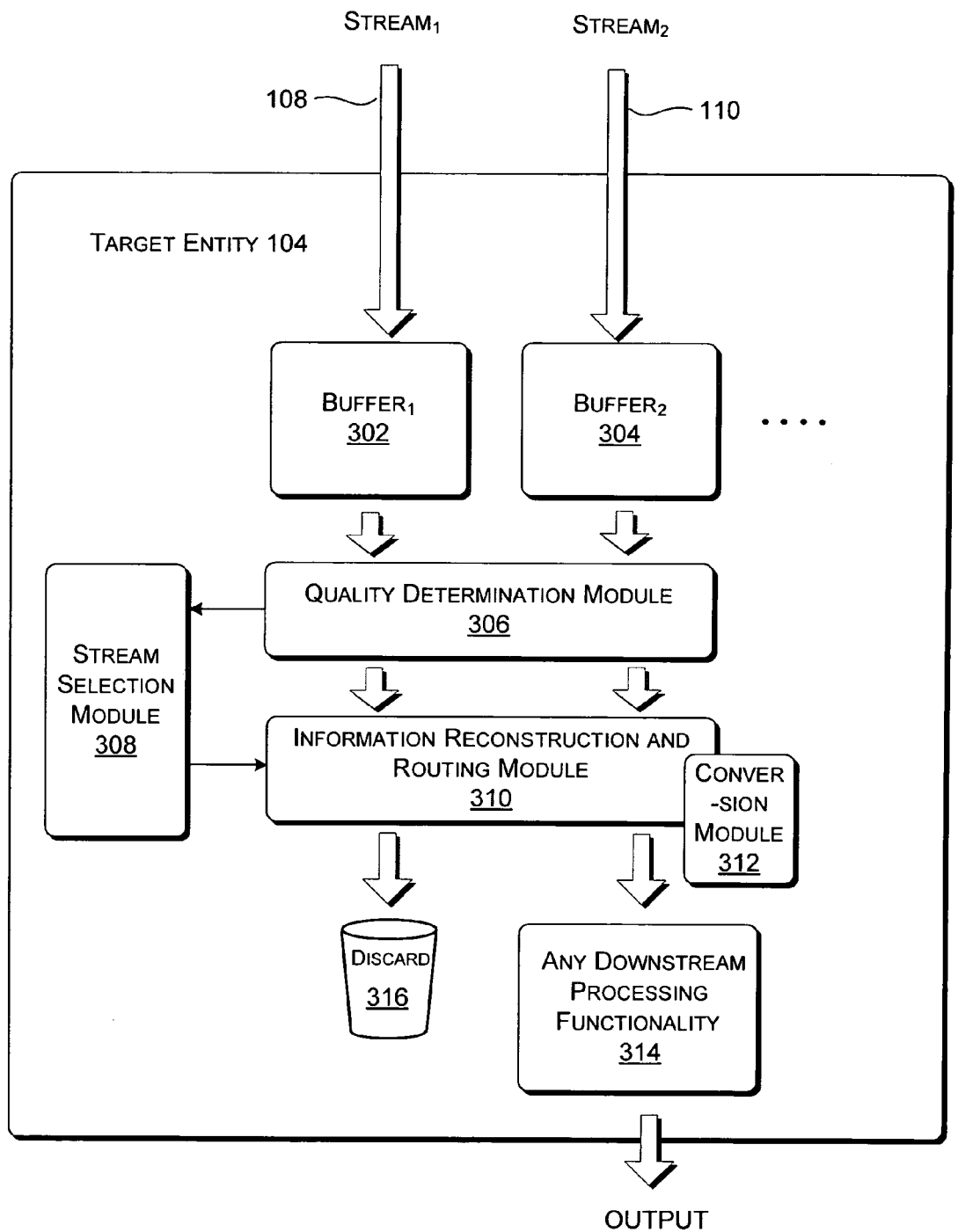
FIG. 3 shows a more detailed depiction of the target entity of FIG. 1.

FIG. 3 shows an exemplary composition of the target entity 104. FIG. 3 will be explained below in basically top-to-bottom fashion.

The target entity 104 can comprise two or more buffers (302, 304) for receiving and storing a portion of recently received media information from streams 108 and 110, respectively. The buffers (302, 304) can comprise different storage units, or can comprise different sections of the same storage unit. The target entity 104 essentially uses the buffers (302, 304) to store a small portion of recently received media information prior to decoding it and performing other processing on it. Among other advantages, this buffering gives the target entity 104 a chance to correct omissions in the primary stream of information 108 before it is processed.

A quality determination module 306 detects the presence of errors in the media information stored in the buffers (302, 304). For instance, the quality determination module 306 can determine whether one or more packets in the received streams (108, 110) are missing or otherwise corrupted. It can perform this role by detecting discontinuities in the received packets (as determined by discontinuities in received packet ID numbers). It should be noted that the target entity 104 may normally receive packets out of order, which is not per se a problem; the quality determination module 306 can flag a discontinuity if a missing packet does not arrive within a predetermined period of time. The quality determination module 306 can also apply various error detection algorithms to determine whether the information within the streams (108, 110) has been corrupted, and therefore has been effectively lost.

A stream selection module 308 determines which of the streams (108, 110) should serve the role of the primary stream 108 (and by default, which of the other streams should serve the role of the backup stream or streams). At the start of transmission, the stream selection module 308 can be configured to initially select the primary stream 108 as the stream which arrives first at target entity 104. Thereafter, the stream selection module 308 can monitor the quality of the streams (108, 110) based on monitoring results provided by the quality determination module 306. The stream selection module 308 uses this data to reassign the role of the primary stream 108 to the stream which is performing best at the moment. The stream selection module 308 can perform this function in different ways, such as by calculating the error rate of each stream over a prescribed period of time, such as 30 seconds. If the primary stream 108 is consistently performing worse than the backup stream 110, then the backup stream 110 is assigned the role of the primary stream 108 and the previous primary stream 108 is assigned the role of the backup stream 110.

An information reconstruction and routing module 310 ("reconstruction module" 310) fills in holes in the primary stream 108 with media information contained the backup stream 110 (if this is possible). The reconstruction module 310 performs this role by determining the units of information (packets, GOPs, etc.) that are missing in the primary stream 108, and substituting counterpart units of information present in the backup stream 110. As will be described in Section B, the missing information pulled from the backup stream 110 may not have the same size or resolution or frame structure as the primary stream 108. To address this scenario, the reconstruction module 310 can provide a conversion module 312 to perform whatever adjustments are necessary to insert the missing information from the backup stream 110 into the primary stream 108. For example, in the case in which the backup stream 110 comprises a picture-in-picture (PIP) stream, the conversion module 312 performs up-scaling to increase the size of media information contained in the backup stream 110 to meet the expectations of the primary stream 108. In one exemplary implementation, the above-described reconstruction module 310 can operate on the media information in the buffers, prior to decoding.

The target entity 104 includes generically-labeled "any downstream processing functionality" 314. This functionality represents, as the name suggests, any downstream processing functionality that processes the reconstructed stream 202 produced by the reconstruction module 310. For instance, this functionality 314 may comprise decoding functionality for decoding the reconstructed stream 202, compositing functionality for combining the reconstructed stream 202 with graphical information prior to output, and so forth.

Finally, FIG. 3 shows a garbage pail 316 to represent that the unused media information contained in the backup stream 108 is essentially "dumped on the floor," simply meaning that it is moved out of the buffer (304) and processed no further.

A.2. Exemplary Manner of Operation

Figure 4:
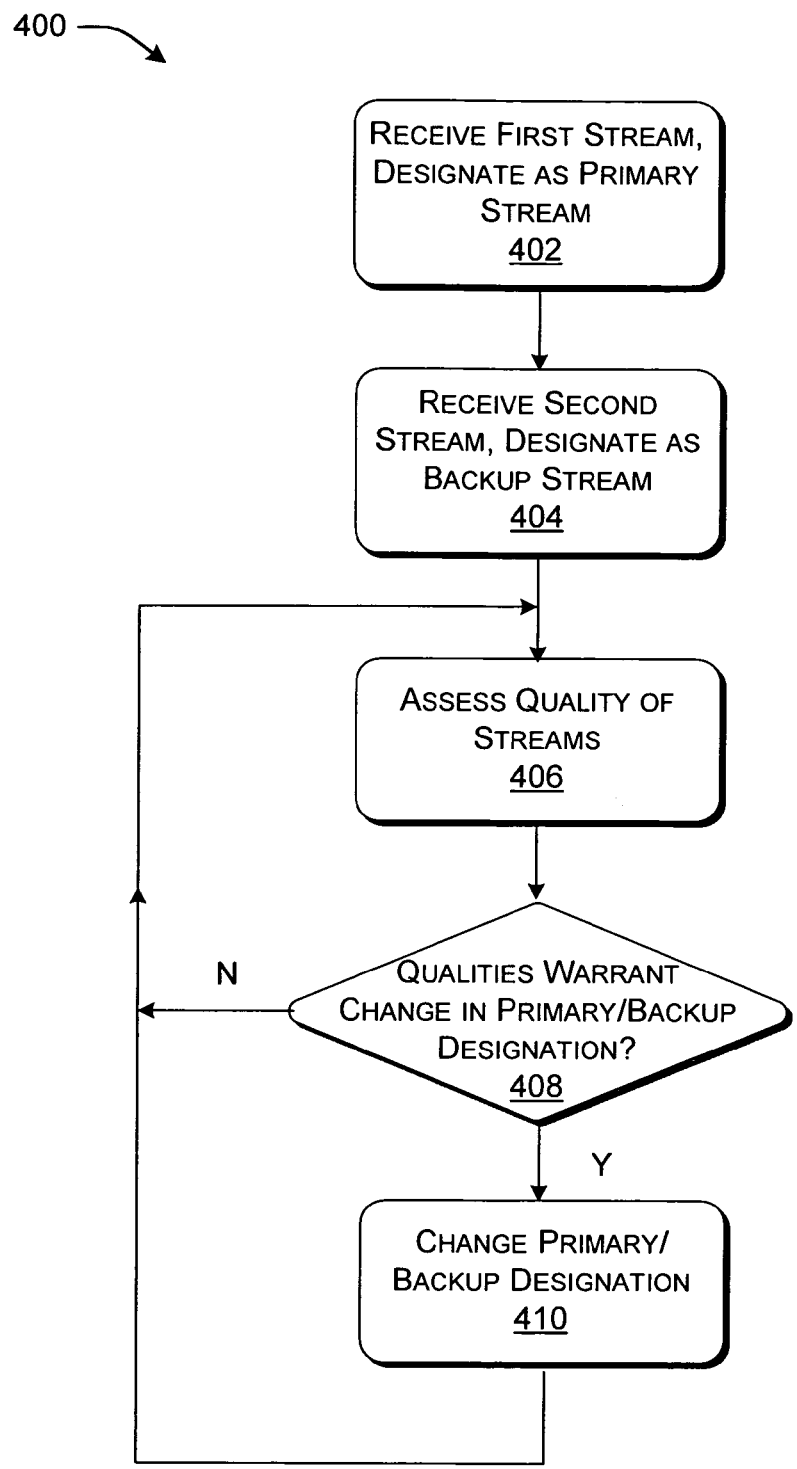
FIGS. 4 and 5 show procedures that illustrate one exemplary manner of operation of the system shown in FIG. 1.
Figure 5:
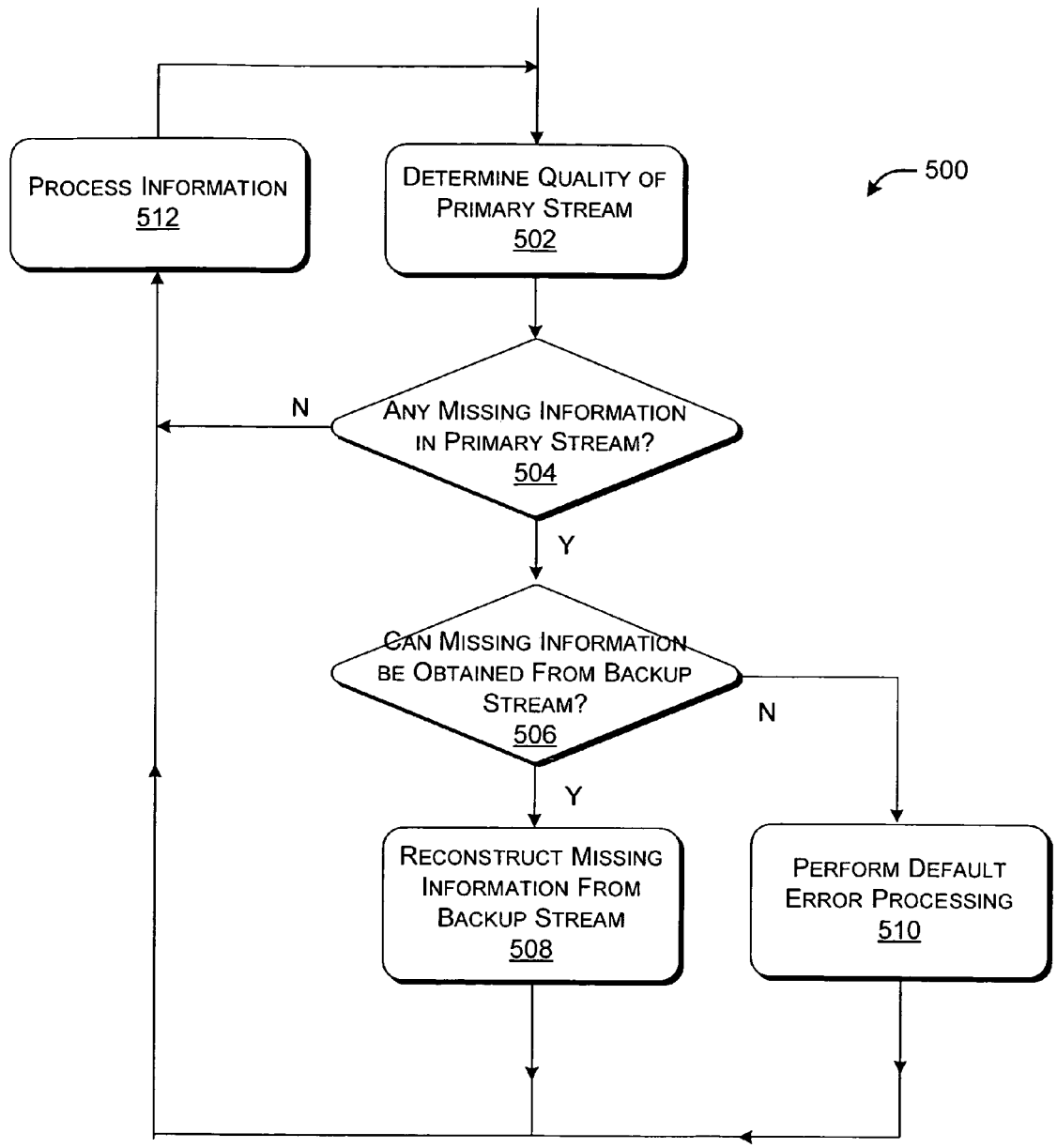

FIGS. 4 and 5 describe the operation of the system 100 (of FIGS. 1-3) in flowchart form. To facilitate discussion, certain operations are described as constituting distinct steps performed in a certain order. Such implementations are exemplary and non-limiting. Certain steps described in these flowcharts can be grouped together and performed in a single operation, and certain steps can be performed in an order that differs from the order shown in the flowcharts. As the functions described in these flowcharts have already been explained in the subsection, the following explanation will serve primarily as a review of those functions.

FIG. 4 shows an exemplary procedure 400 which illustrates an exemplary manner in which the target entity 104 selects a primary stream from a plurality of received redundant streams. In step 402, at the start of transmission, the target entity 104 receives a first stream —meaning the stream that temporally arrives first at the target entity 104. The target entity 104, by default, selects the first stream as the primary stream 108. In step 404, the target entity 104 selects any one or more later arriving streams as backup streams, such as backup stream 110.

In step 406, the target entity 104 assesses the quality of the streams (108, 110). This function can be performed by the quality determination module 306 of FIG. 3. Quality can be assessed using the techniques described above, such as by detecting missing packet ID numbers, corrupted packets, and so forth. In step 408, the target entity 104 determines whether the quality assessed in step 406 warrants reassigning the role of the primary stream to another stream. In step 410, the target entity 104 executes a change in steam designations, swapping a backup stream for a faltering primary steam. The stream selection module 308 of FIG. 3 can perform steps 408 and 410.

FIG. 5 shows an exemplary procedure 500 which illustrates an exemplary manner in which the target entity 104 fills in missing information in the primary stream 108 with information from the backup stream 110. In step 502, the target entity 104 can determine the quality of the media information in the primary stream 108. In step 504, based on the results of step 502, the target entity 104 can determine whether there is any missing information (or corrupted information) in the primary stream 108. The quality determination module 306 of FIG. 3 can perform steps 502 and 504.

In step 506, the target entity 104 determines whether the assessed missing information can be obtained from the backup steam 108. (And if there are plural backup streams, then step 506 comprises determining whether any of the backup streams can be used to supply the missing information. This is a determination which comes into play when a first backup stream also lacks the missing information.) In step 508, the target entity 104 reconstructs the primary stream 108 by supplying the assessed missing information from the backup steam 110. This operation can comprise substituting in appropriate units of information (e.g., packets, GOPs, etc.) from the backup stream 110 into the primary steam 108, as guided by appropriate indexing information associated the units.

On the other hand, in step 508, if none of the back streams contains the information, the target entity can perform any kind of default error processing. This default error processing can comprise specifically requesting the source entity 102 to supply the missing information (e.g., using a NAK protocol, or some other protocol). Or step 510 may comprise simply "doing nothing," in which case the media information is rendered with one or more holes in the primary stream 108 that are not filled. The reconstruction module 310 of FIG. 3 can be used to perform steps 506, 508, and 510.

Finally, in step 512, the target entity performs whatever processing is appropriate based on the reconstructed stream 202. The functionality 314 of FIG. 3 can perform this role.

B. Exemplary Application to Streaming Media Environment

B.1. Overview of System

Figure 6:
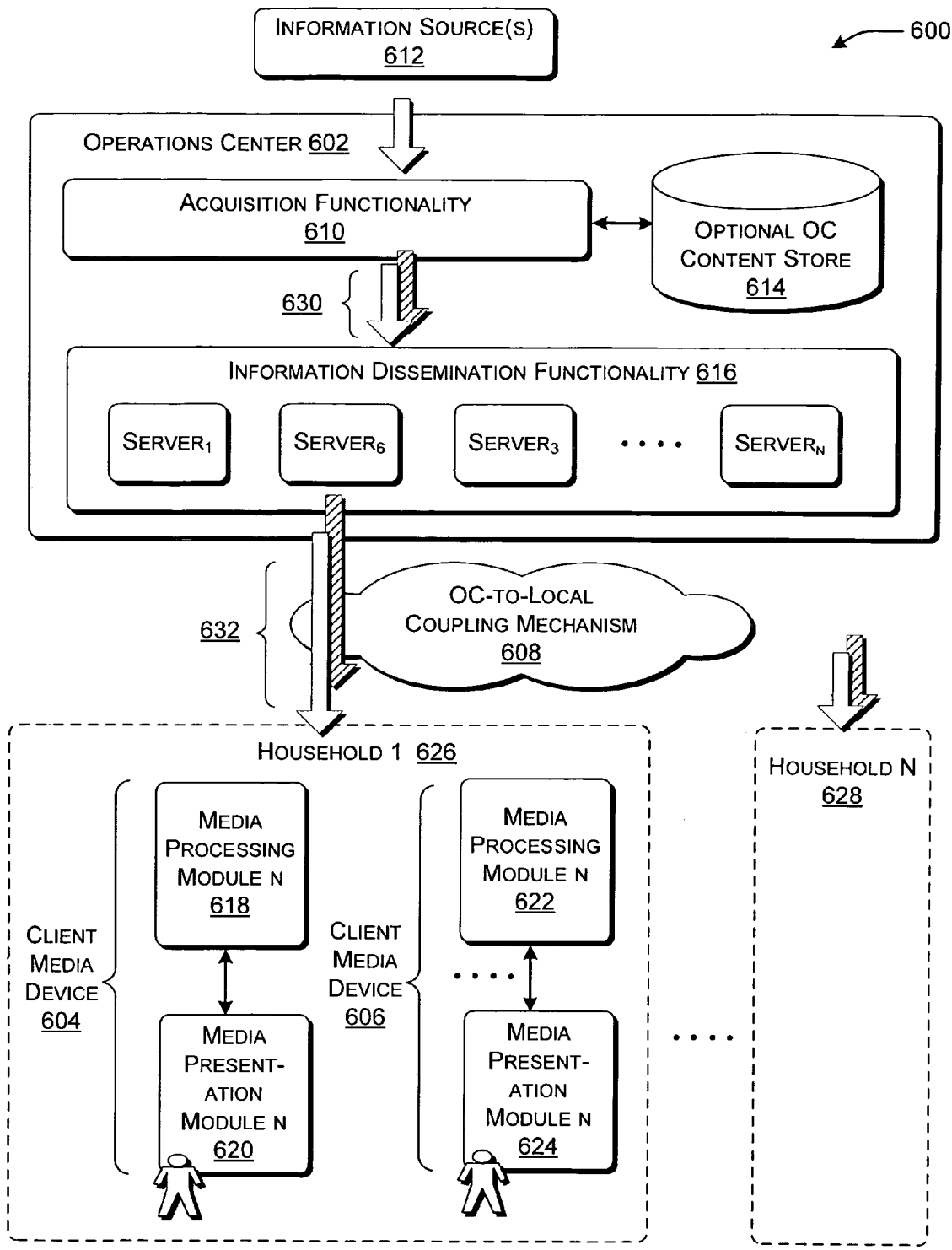
FIG. 6 shows an exemplary media delivery environment that can make use of the system shown in FIG. 1.

There are numerous applications of the system 100 described in the preceding section. With reference first to FIG. 6, the following section describes one exemplary application of the system 100 to a media streaming environment 600 in which an operations center 602 distributes television programs, movies, and so forth to a plurality of media devices (604, 606, ...) via a coupling mechanism 608. In this context, the source entity 102 comprises the operations center 602. The target entity 104 comprises any of the media devices (604, 606, ...). In general, the indicated allocation of processing functionality (to be described) between the operations center 602 and the media devices (604, 606 ...) is merely exemplary; different implementations can vary the illustrated allocation of functionality in various ways.

The operations center 602 includes acquisition functionality 610 for supplying the media information from one or more sources 612 of such information. The sources 612 can represent any kind of entity which produces or provides media information, such as cable or satellite television providers, one or more Video-On-Demand (VOD) providers, one or more publishing houses of information, one or more library sources, any kind of Internet-enabled repository, and so on. The acquisition functionality 610 can comprise one or more server computers or other functionality dedicated to the task of retrieving the media information. The operations center 602 can optionally also include an information content store 614 for storing (e.g., caching) the media information prior to its dissemination to the media devices (604, 606 . . . ). The information content store 614 can be implemented as one or more databases and associated database management functionality.

The system operations center 602 also can include information dissemination functionality 616 for supplying media information to the media devices (604, 606 . . . ) via the coupling mechanism 608. Different systems may use the information dissemination functionality 616 in different ways. One exemplary system may use the information dissemination functionality 616 to transmit media information received from the acquisition functionality 610 in unicast fashion, multicast fashion, or a combination of unicast and multicast fashion. For example, co-pending and commonly assigned U.S. patent application Ser. No. 10/010,200, entitled, "ACCELERATED CHANNEL CHANGE IN RATE-LIMITED ENVIRONMENTS," naming the inventors of Geoffrey R. Smith et al., filed on Dec. 10, 2004, provides further exemplary details regarding one protocol for delivering resource information using a combination of unicast and multicast techniques. The information dissemination functionality 616 can be implemented as a collection of servers or other processing functionality that facilitate the transmission of media information to the media devices (604, 606 . . . ).

To facilitate discussion, it will be assumed for the purposes of the present discussion that the information dissemination functionality 616 provides media information to the media devices (604, 606, . . . ) mainly using a multicast mode of transmission. In this mode, the information dissemination functionality 616 allows the media devices (604, 606, . . . ) to connect to multicast streams associated with respective multicast addresses. In the context of the present invention, the information dissemination functionality 616 can use different respective multicast streams (and associated multicast addresses) for supplying the primary stream 108 and the backup stream 110 to one or more media devices (604, 606, . . . ) that request such streams.

The operations center 602 can use high speed communication mechanisms to couple the above described components together. For example, the operations center 602 can use high speed fiber optic cables to send media information from the acquisition functionality 610 to the information dissemination functionality 616.

The coupling mechanism 608 couples the operations center 602 to the media devices (604, 606, . . . ). This coupling mechanism 608 can be implemented in various ways (such as by using the mechanisms described above with reference to FIG. 1). For example, the coupling mechanism 608 can use any kind of network (or combination of networks), such as a wide area network (e.g., the Internet), an intranet, Digital Subscriber Line (DSL) network infrastructure, point-to-point coupling infrastructure, and so on.

Now referring to the client-side aspects of the environment 600, the media devices (604, 606, . . . ) can be implemented in different ways. A given media device (604, 606, . . . ) can represent a television set with integral IP interfacing/processing functionality, a television set with an associated set-top box coupled thereto, a digital video recorder (DVR) device, a rewritable digital video disc (DVD-RW) device, a personal computer having AV processing functionality, and so forth (as well as any combination of these devices). In whatever manner the media devices (604, 606, . . . ) are implemented, they can comprise a media processing module that is communicatively coupled to a media presentation module. For instance, the client device 604 includes media processing module 618 coupled to media presentation module 620, and the client 19 device 606 includes media processing module 622 coupled to a media presentation module 624. The media processing modules (618, 622) comprise functionality for processing the media information and performing other data processing functions, and the media presentation modules (620, 624) comprise functionality for presenting the output of the media processing modules (618, 622).

The environment 600 can include multiple households (626, 628, . . . ). Each household can include one or more media devices. For example, household 626 includes at least media device 604 and media device 606. The operations center 602 can allocate a prescribed amount of bandwidth to each household. This places limitations on the maximum amount of information that can be streamed to a household at any one time. The operations center 602 can also optionally allocate a prescribed number of channels to the household. This places limitations on the maximum number of streams that can be received at the same time. In one case, the environment 600 assigns a unique port identifier to each household.

Although not shown, each household can include an internal routing mechanism, such as a LAN, router, etc. to route media information received from the operations center 602 to appropriate media devices within the household that have requested this information. Each media device within the household can distinguish streams of media information by stream ID information associated with different streams.

The communication paradigm introduced in the previous section can be applied in the environment 600 in different capacities. In a first scenario, the operations center 602 can use redundant streams to send information from the acquisition functionality 610 to the dissemination functionality 616. FIG. 6 denotes this conduit of information as path 630. In a second scenario, the operations center 602 can use redundant streams to send information from the operations center 602 to the households (626, 628, . . . ). FIG. 6 denotes this conduit of information as path 632. In one implementation, path 630 is a high speed path (e.g., a fiber optic path) that does not impose any bandwidth constraints on the amount of information that can be transmitted at any one time. But, as stated, path 632 may impose bandwidth and other constraints on the information that is transmitted over the coupling mechanism 608.

To accommodate the above-noted features, for the path 630 within the operations center 102, the environment 600 can use one or more backup streams that are exact duplicates of the primary stream. In other words, the primary stream 108 and the backup stream 110 can have the same bandwidth (i.e., bit rate).

On the other hand, for path 632, the environment 600 can use one or more backup streams that are not exact duplicates of the primary stream. In other words, the primary stream 108 and the backup stream 110 can have different bandwidths. And more specifically, the backup stream 110 can have a smaller bandwidth than the primary stream 108. The environment 600 can also apply various channel-conserving measures to accommodate channel restrictions that may be present in path 632. Subsections B.3 and B.4(below) provide additional details regarding strategies that can be used to address constraints present in the path 632.

B.2. Exemplary Client-End Functionality

Figure 7:
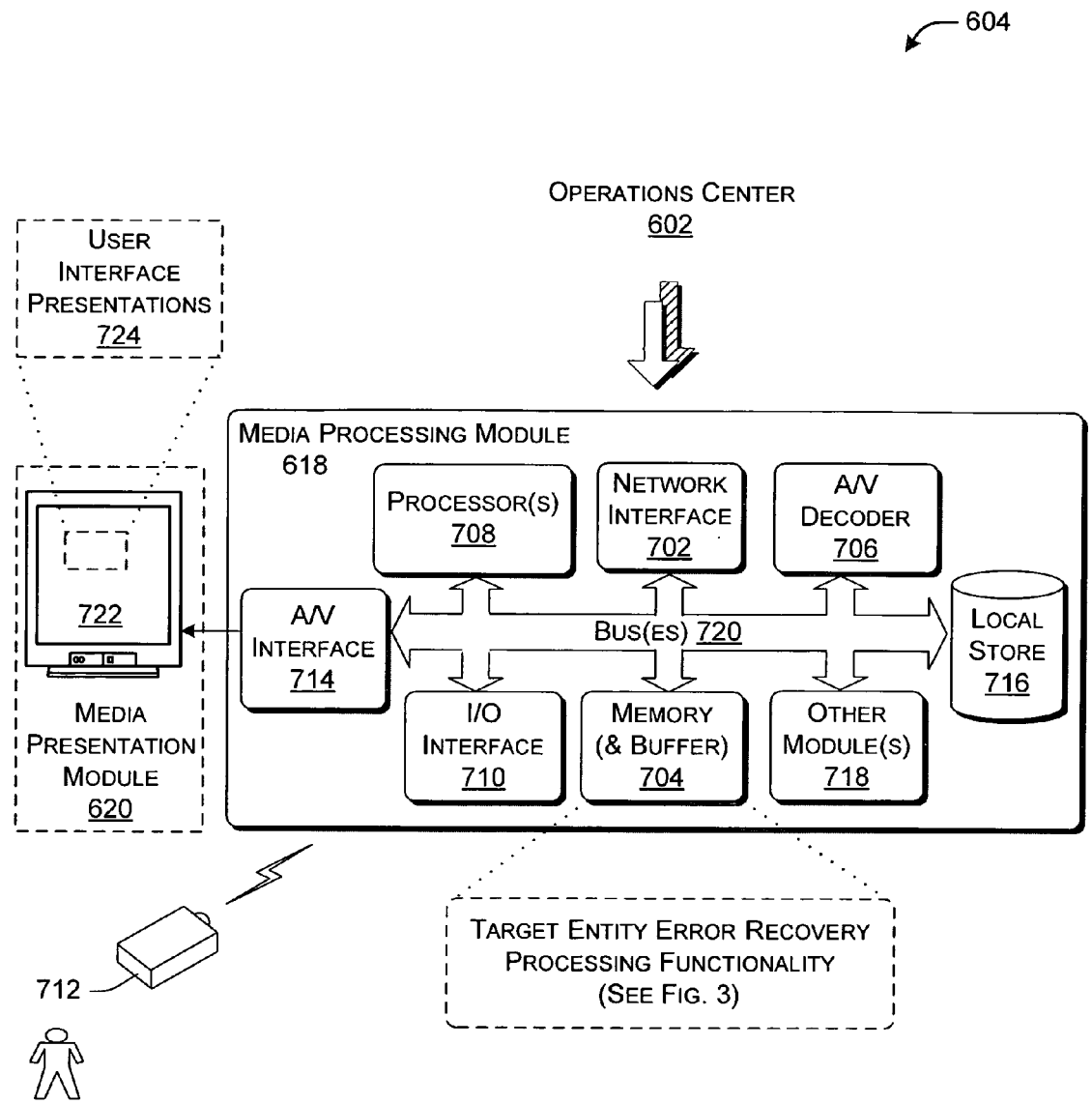
FIG. 7 shows an exemplary media device that can be used in the environment of FIG. 6.

FIG. 7 provides additional details regarding the representative client device 604 (introduced in the context of FIG. 6). The client device 604 itself comprises the above-identified media processing module 618 coupled to the media presentation module 620. In one case, the media processing module 618 can comprise AV processing functionality combined with the media presentation module 620 in a single integrated device (e.g., in a single IP-ready television set). In another case, the media processing module 618 can comprise a separate set-top box, DVR unit, or other kind of separate unit that communicatively couples to the media presentation module 620 (e.g., a television screen) via cable coupling or the like.

The media processing module 618 can include a number of modules for performing its ascribed tasks. To begin with, the media processing module 618 includes a network interface module 702. The network interface module 702 can represent any functionality for receiving media information from the operations center 602 using any coupling mechanism. For example, the network interface module 702 can comprise an Ethernet NIC, a DSL modem, a cable modem, a wireless network interface, or other kind of network interface equipment. The media processing module 618 also includes memory 704. A portion of the memory 704 can comprise program instructions for implementing any of the processing functions described in Section A. The media processing module 618 also includes an audio-visual (AV) decoder 706 for decoding (and decompressing) the received media information into its video and audio components. Decoding comprises ordering packets (if received out of order), extracting media information from the stream of received packets, and also extracting timing information that will govern the playback of the media information. The media processing module 618 also includes one or more processors 708 for executing instructions to implement the functionality of the media processing module 618. The media processing module 618 also includes an I/O interface 710 for interacting with the user via one or more input devices, such as a remote controller 712, a personal computer (not shown), a joy stick (not shown), a voice recognition mechanism (not shown), and so forth. The media processing module 618 also includes an A/V interface module 714 for providing media information in an appropriate format to the media presentation module 620. The media processing module 618 also includes a local store 716 for storing recorded programs and other data. Finally, the client processing module 618 can include various other modules 718, not specifically identified by name in the figure. For instance, the client processing module 618 can include a graphics compositor for combining a video component of the media information from the AV decoder 706 on a frame-by-frame basis with graphics information. The graphics information may comprise various user interface presentations which are overlaid on the media information. One or more busses 720 communicatively couple the above-identified components together.

The media presentation module 620 can comprise any kind of device for presenting AV information, including a CRT-type device, an LCD-type device, and so forth. In any case, the media presentation device 620 defines a display surface 722. The media processing module 618 can present one or more user interface presentations 724 on the display surface 722.

B.3. Exemplary Strategies for Handling Bandwidth Constraints

As described in connection with FIG. 6, there are circumstances in which a communication path may not allow for the use of a backup stream 110 that has the same size (e.g., bit rate) as the primary stream 108. This may apply, for instance, in the case of the path 632 used to send media information from the operations center 602 to the media devices (604, 606, . . . ). In this circumstance, a backup stream 110 can be generated that generally contains the same program as the primary stream 108, but which has a smaller size compared to the primary stream 108.

Figure 8:
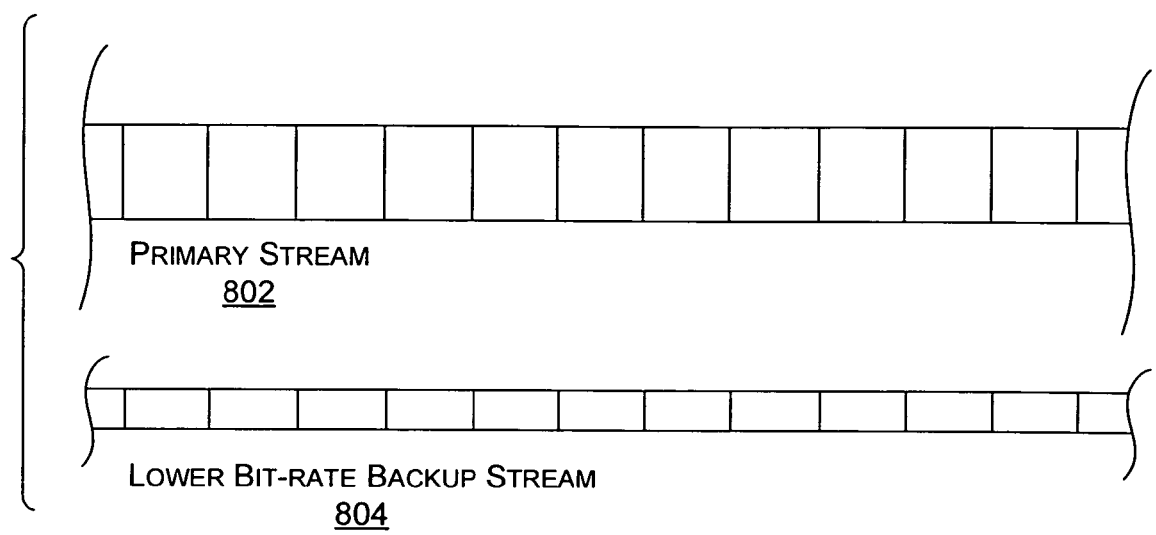
FIG. 8 shows an exemplary collection of streams having different bit rates that can be used to carry redundant information in the environment of FIG. 6.

Consider, for example, FIG. 8. This figure shows the use of a primary stream 802 that has a larger bit rate than a backup stream 804. In the following discussion, the terms bit rate and bandwidth will be used interchangeably. Both terms generally refer to an amount of information that is transmitted per unit interval of time (e.g., bits per second, in one case). There are different ways to reduce the bandwidth of the backup stream 804 relative to the primary stream 802. Three such exemplary strategies are described below, although one skilled in the art will appreciate that additional strategies can be used.

According to a first strategy, the backup stream 804 can represent a quality-compromised version of the primary stream 802. To provide one non-limiting example, the primary stream 802 can be sent at 1.5 mbps, while the backup stream 804 can be sent at 500 kbps. In this strategy, the streams (802, 804) can still employ the same packetization structure.

According to a second strategy, the backup stream 804 can provide only selected frames of the primary stream 802. For example, the primary stream 802 can include a sequence of key frames (e.g., MPEG-2 I frames) intermixed with a series of delta frames (e.g., MPEG-2 B and P difference frames). The backup stream 804 can reduce the amount of information transmitted by providing a stream that only includes key frames (e.g., MPEG-2 I frames).

According to a third strategy, the backup stream 804 can be formulated as a reduced-size version of the primary stream 802. For example, the backup stream 804 can be formulated as a picture-in-picture (PIP) stream. In one illustrative and non-limiting case, a PIP stream can be transmitted at 200 kbps. To accommodate this solution, the media device needs to scale up the missing information pulled from the PIP stream so that it has the same size as the information in the primary stream 802. The PIP-based solution is particularly desirable because the environment 600 may already accommodate the transmission of PIP streams to the media devices (604, 606, . . . ). This solution can retool these PIP streams to serve the role of backup streams in the context of the present invention.

Generally, in those cases in which the primary stream 802 is not an exact duplicate of the backup stream 804, the packetization structure of the primary stream 802 may be different than the packetization structure of the backup stream 804. This factor may preclude replacing missing information in the primary stream 802 on the level of granularity of packets. To address this issue, the media device can replace missing information in the primary stream 802 on the level of granularity of Group of Pictures (GOPs), or on some other level. (By way of background, the MPEG-2 standard defines image content in a hierarchy of units. The most encompassing such unit comprises a video sequence, demarcated by a sequence header and an end-of-sequence code. A sequence can include one or more groups of picture (GOPs). A GOP, in turn, can comprise one or more pictures.)

B.4. Exemplary Strategies for Handling Number-of-Stream Constraints

As another constraint, the path 632 shown in FIG. 6 can also restrict the number of streams that each household can receive. This also places restrictions on the number of backup streams that can be fed into a household.

Figure 9:
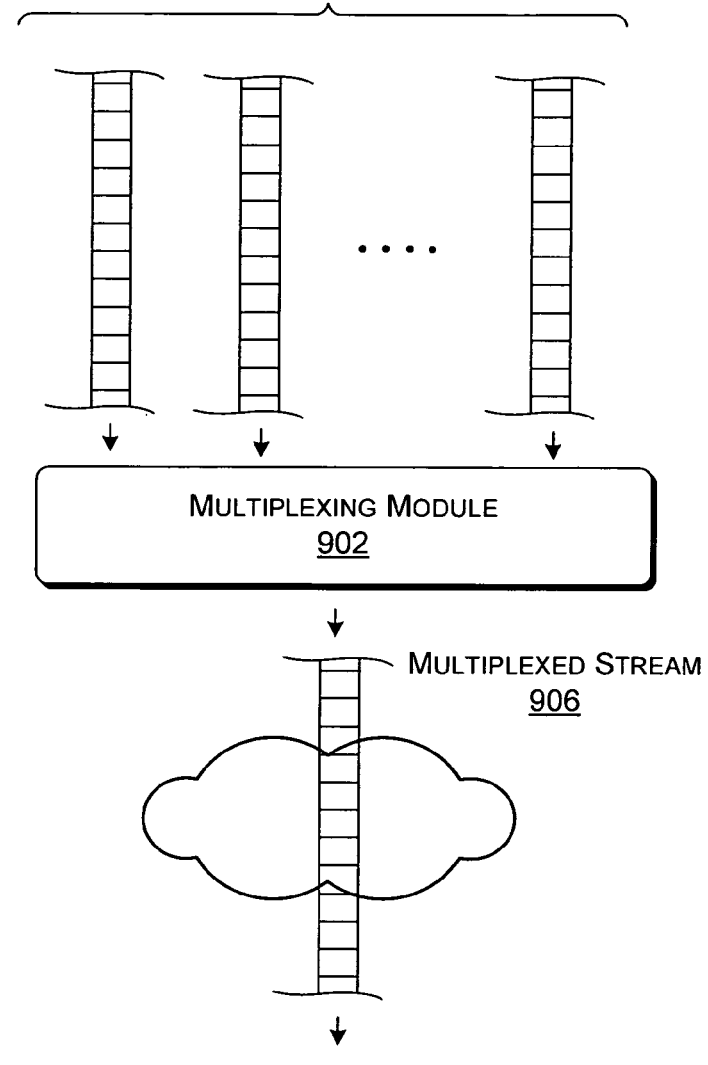
FIG. 9 shows an exemplary multiplexing and de-multiplexing mechanism for delivering a collection of streams in the environment of FIG. 6.

One way of addressing this constraint is illustrated in FIG. 9. As indicated there, the operations center 602 (and, more specifically, the dissemination functionality 616) can multiplex plural reduced-bandwidth streams into a single multiplex stream, and then forward this single stream to the households. At the households, this multiplex stream is de-multiplexed so that individual media devices can extract the streams that they require.

For example, suppose that a household include four media devices, and that all four media devices are being used simultaneously by four different users to watch four different television programs. To accommodate the error recovery strategies described herein, each media device should receive a primary stream and reduced-bandwidth backup stream. For sake of simplicity, assume that the lower-bandwidth backup stream is a PIP stream. Accordingly, the household makes a request to the operations center 602 to deliver four primary streams and four PIP backup streams.

In response to this request, the operations center 602 uses a multiplexer module 902 to dynamically combine four PIP streams 904 together into a single multiplexed stream 906. The operations center 602 then streams this multiplexed stream 906 to the household. At the household, each recipient media device using a de-multiplexing module 908 to extract the PIP stream that it needs (associated with the program that user is watching). A media device can discriminate the PIP stream that it needs based on ID information that accompanies the stream.

This strategy is efficient because the multiplexed stream 906 constitutes a single stream, yet it is composed of many elementary streams. Thus, even though the household may have a limit on the number of streams that it can receive, the above strategy circumvents this constraint by packaging plural streams into a single stream.

In one implementation, a single multiplex address can be associated with the multiplex stream 908, while different port identifiers can be associated with each household. The operations center can generate and disseminate the multiplex stream 906 to a particular household using the combination of the single multiplex address and a particular port identifier associated with the household.

As a final point, the multiplex stream 906 can accommodate many different kinds of streams, not simply PIP streams. For example, the operations center 102 can package any kind of supplemental data into the. multiplex stream 906, along with the PIPs, such as notification data.

In closing, a number of features were described herein by first identifying exemplary problems that these features can address. This manner of explication does not constitute an admission that others have appreciated and/or articulated the problems in the manner specified herein. Appreciation and articulation of the problems present in the relevant arts are to be understood as part of the present invention. More specifically, there is no admission herein that the features described in the Background section of this disclosure constitute prior art. Further, the description of a limit set of problems in the Background section does not limit the application of invention to solving only those problems; it can be applied to problems and environments not expressly identified herein.

Further, the subject matter set forth in the Summary section and the Abstract of this disclosure do not limit the subject matter set forth in the claims.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for disseminating information to a target entity, the method comprising:

transmitting, from a source entity to the target entity a plurality of received redundant streams, wherein the plurality of received redundant streams includes at least a primary stream of information on a first network connection and a backup stream of information on a second network connection;

selecting the primary stream of information from the plurality of received redundant streams, wherein selecting includes selecting from the plurality of received redundant streams the stream that arrives first and designating it as the primary stream of information and selecting a later arriving stream and designating it as the backup stream of information;

monitoring the quality of the primary stream of information and the backup stream of information, wherein monitoring includes calculating an error rate for the primary stream of information and the backup stream of information over a predetermined period of time, wherein monitoring includes determining if the quality of the primary stream of information warrants reassigning the designation of primary stream of information to one of the received redundant streams;

redefining the primary stream of information as a stream of information having the best quality, wherein redefining includes changing the designation of primary stream of information from a faltering primary stream of information to one of the received redundant streams and designating the faltering primary stream of information as the backup stream of information;

receiving, at the target entity, the primary stream of information and the backup stream of information;

identifying whether the primary stream of information includes missing information, wherein identifying includes flagging a discontinuity in the primary stream of information if the missing information does not arrive within a predetermined period of time;

determining if the missing information is obtainable from the backup stream of information to repair the discontinuity in the primary stream of information; and supplying the missing information to repair the discontinuity in the primary stream of information from the backup stream of information.

2. The method of claim 1, wherein the primary stream of information and the backup stream of information comprise media information.

3. The method of claim 1, wherein the transmitting comprises multicasting-transmitting the primary stream of information and the backup stream of information, wherein the primary stream of information is associated with a first multicast address and the backup stream of information is associated with a second multicast address.

4. The method of claim 1, further comprising initially defining, at the target entity, the primary stream of information as a stream of information which is received first at the target entity.

5. The method of claim 1, wherein the primary stream of information and the backup stream of information have approximately the same bandwidth.

6. The method of claim 1, wherein the backup stream of information has a smaller bandwidth than the primary stream of information.

7. The method of claim 6, wherein the backup stream of information has a lower quality compared to the primary stream of information.

8. The method of claim 6, wherein the backup stream of information includes a subset of the frames contained in the primary stream of information.

9. The method of claim 6, wherein the backup stream of information comprises a reduced-scale version of the primary stream of information.

10. The method of claim 1, wherein the supplying of the missing information is performed on a granularity of packets.

11. The method of claim 1, wherein the supplying of the missing information is performed on a granularity of Group of Pictures (GOPs).

12. The method of claim 1, wherein the transmitting comprises transmitting the backup stream of information in a multiplexed stream of information, wherein the multiplexed stream of information includes at least one other stream of information multiplexed in with the backup stream of information.

13. The method of claim 12, wherein the multiplexed stream of information is associated with a single multiplex address.

14. One or more machine-readable media containing machine-readable instructions for implementing the method of claim 1.

15. A system for disseminating information, the system comprising:
a coupling mechanism;
a source entity configured to perform acts comprising:
transmit at least a primary stream of information on a first network connection of the coupling mechanism and a backup stream of information on a second network connection of the coupling mechanism;
select the primary stream of information from the plurality of received redundant streams, wherein selecting includes selecting from the plurality of received redundant streams the stream that arrives first and designating it as the primary stream of information and selecting a later arriving stream and designating it as the backup stream of information;
monitor the quality of the primary stream of information and the backup stream of information, wherein monitoring includes calculating an error rate for the primary stream of information and the backup stream of information over a predetermined period of time, wherein monitoring includes determining if the quality of the primary stream of information warrants reassigning the designation of primary stream of information to one of the received redundant streams;
redefine the primary stream of information as a stream of information having the best quality, wherein redefining includes changing the designation of primary stream of information from a faltering primary stream of information to one of the received redundant streams and designating the faltering primary stream of information as the backup stream of information; and
a target entity configured to perform acts comprising:
receive the primary stream of information and the backup stream of information;
identify whether the primary stream of information includes any missing information;
flag a discontinuity if the missing information does not arrive within a predetermined period of time;
determine if the missing information is obtainable from the backup stream of information in order to repair the discontinuity in the primary stream of information; and
supply the missing information to the primary stream of information from the backup stream of information.

16. The system of claim 15, wherein the source entity is associated with functionality for disseminating media information to a collection of target entities.

17. A target entity for receiving information, the target entity comprising:
logic configured to receive at least a primary stream of information on a first network connection and a backup stream of information on a second network connection;
logic configured to monitor the quality of the primary stream of information and the backup stream of information, wherein the logic configured to monitor includes logic configured to calculate an error rate for the primary stream of information and the backup stream of information over a predetermined period of time;
logic configured to determine if the quality of the primary stream of information warrants reassignment of the designation of primary stream of information as the backup stream;
logic configured to redefine the primary stream of information as a stream of information having the best quality, and configured to change the designation of primary stream of information from a faltering primary stream of information to the backup steam and designate the faltering primary stream of information as the backup stream of information;
logic configured to identify whether the primary stream of information includes any missing information;
logic configured to flag a discontinuity in the primary stream if the missing information does not arrive within a predetermined period of time;
logic configured to determine if the missing information is obtainable from the backup stream of information in order to repair the discontinuity in the primary stream of information; and
logic configured to supply the missing information to repair the discontinuity in the primary stream of information from the backup stream of information.

18. The target entity of claim 17, wherein the target entity comprises functionality for receiving media information from an operations center via a multicast mode of transmission.

19. The target entity of claim 17, further comprising de-multiplexing means for extracting the backup stream of information from a multiplexed stream of information containing at least one other stream of information.

* * * * *